Figure 1:
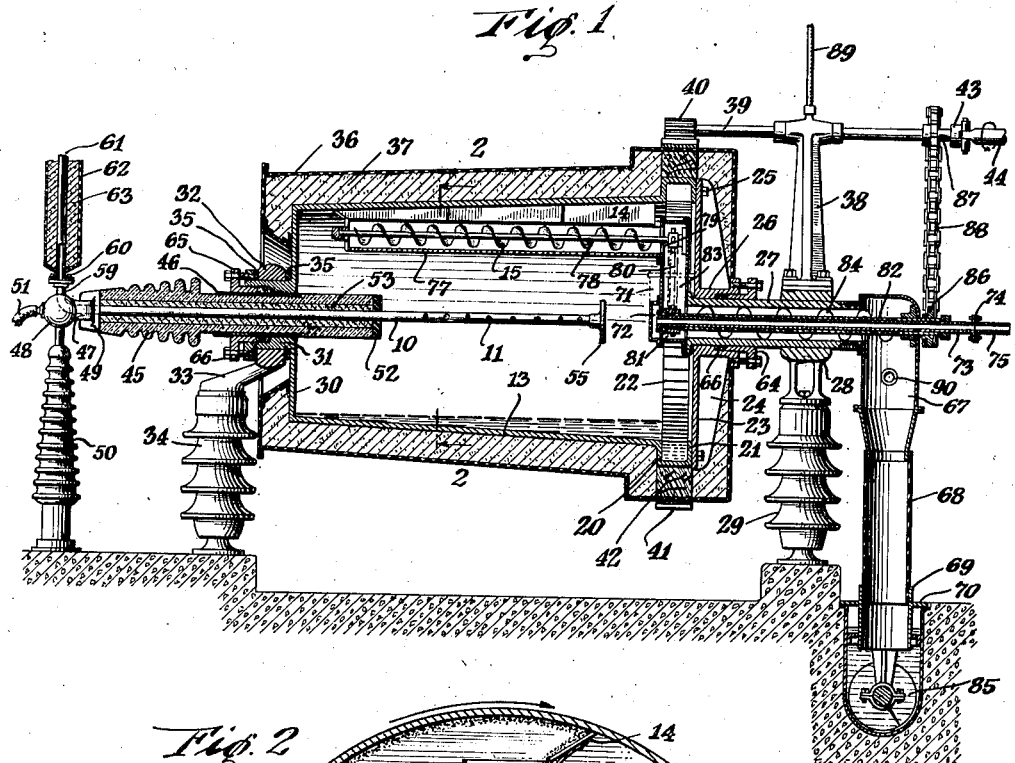

Dec. 19, 1933.  R. E. STANTON  1,940,654
DEWAXING PETROLEUM
Filed May 4, 1931

INVENTOR
Robert E. Stanton
BY HIS ATTORNEYS

Patented Dec. 19, 1933

1,940,654

UNITED STATES PATENT OFFICE 1,940,654

DEWAXING PETROLEUM

Robert E. Stanton, Denver, Colo.

Application May 4, 1931. Serial No. 535,007

14 Claims. (Cl. 204—1)

This invention relates to the separation of waxes from petroleum oils, and relates more particularly to the electrostatic separation of solid wax particles from petroleum oils, for example, lubricants, in which they are present in suspension.

My process consists briefly in subjecting a petroleum oil in which are suspended solid wax particles to the action of a unidirectional high voltage electrostatic field in such manner that charges of a definite polarity are impressed upon the wax particles; causing the wax particles so charged to approach an oppositely charged electrode, whereby they will be attracted by and collected upon said oppositely charged electrode; withdrawing the treated oil without requiring it to be filtered through the collected wax; and removing the collected wax particles from the collecting electrode. I prefer the collecting electrode to have a smooth surface so that the wax may be easily removed therefrom mechanically, for example, by scraping.

The principles underlying the separation of solids from fluids by the use of a unidirectional high voltage electrostatic field are well known, and have been extensively applied commercially by Cottrell and others to the separation of particles of soot and dust from gases. So far as I am aware, however, these principles have never been applied to the separation of wax from petroleum oil, nor to the separation of any similar solids and liquids.

Both unidirectional and alternating high voltage electrostatic fields have been used for separating colloidal suspensions of water in petroleum oil. However, in these processes of dehydrating petroleum oil, the function of the electrostatic field is merely to break the emulsion and cause an agglomeration or coalescence of the particles of water, which then separate out due to the difference in specific gravity between the water and the oil. Unlike the smoke precipitation processes and the present invention, these processes do not involve the attraction and collection of charged particles upon an oppositely charged electrode.

I have found that a high voltage alternating electrostatic field has a somewhat similar coalescing or agglomerating effect upon solid wax particles suspended in petroleum oil. However, in this case the separation must still be obtained by reason of the difference in density between the solid wax and the suspending oil. Under some circumstances it may be helpful to thus enlarge the size of the wax particles before separating them from the oil by a high voltage unidirectional field in accordance with my invention. I wish it to be distinctly understood, therefore, that I may agglomerate the wax particles in this manner if desired prior to the final separation of the wax from the oil.

My invention must also be distinguished from the various processes of electro-osmosis and dialysis, which employ semi-permeable membranes or filters of one form or another, sometimes even formed from the solid to be separated itself. It will be evident to any one familiar with the difficulties of filter pressing wax bearing oil that such processes would be entirely inapplicable to the separation of wax from petroleum oils. According to my invention, as stated above, the oil from which wax has been removed, as described, is not filtered through the wax collecting on the electrode. This at once distinguishes my invention from all filtering processes, whether supplemented by electrical action or not.

Present commercial methods of separating solid wax particles from petroleum oil, such as cold filtering, centrifuging and filter pressing, all depend to a marked degree upon the physical structure of the wax particles, that is to say, whether they are of readily recognizable crystalline form or mal-crystalline, and their size and density. It is an outstanding advantage of my invention that it is not limited in its application by any such requirement. On the contrary, my invention is generally applicable to the separation of solid wax particles from a suspending petroleum oil, and does not appear to depend upon any colloidal properties of the suspension, nor upon any particular size, density or structure of the solid wax particles.

It is necessary for the carrying out of my process that the wax be present in the oil in a solid state. In order to meet this requirement, I chill the oil by refrigerating it, although not necessarily to the same extent as is now common practice, for instance, in the centrifuging of wax bearing oils. Since lubricants at the low temperatures used are extremely viscous, it is usually necessary to dilute the wax bearing oil prior to refrigeration with naphtha or other solvent. This step also is common practice in the dewaxing of lubricants.

In order to avoid possible dangers from fire or explosion, I prefer to carry out my process in the substantial absence of air or oxygen. I may use, for example, an atmosphere of hydrocarbon gas such as ordinary fuel gas or the tail-gas usually available in a refinery from the operation of cracking units. Suitable apparatus for the introduction and maintenance of such an atmosphere will be described hereinafter.

As stated above, I impress a fairly strong electrostatic charge on the solid wax particles and then present them to the influence of an oppositely charged electrode which serves to attract and collect them. Solid particles in general not only possess the property of acquiring a static electric charge and by reason thereof being attracted to an oppositely charged electrode, but will after an interval of time, depending upon the degree of their electrical conductivity, deliver their charge to the collecting electrode and assume a charge corresponding thereto, whereupon they will tend to be repelled by the collecting electrode. Solid wax particles, being poor conductors of electricity, will lose their electric charge relatively slowly when in contact with an opposite charged conductor. Even non-conducting charged particles, however, will eventually tend to be repelled by an oppositely charged electrode, and it is necessary, therefore, to provide some way of avoiding the effect of this repulsion of the particles by the collecting electrode after they have been attracted thereto. This may be accomplished in a number of ways. One is to change the polarity of the electrodes at suitable intervals, another is to remove the collected particles before they have an opportunity to change their polarity and be repelled, and a third is to remove the separated liquid from the neighborhood of the collected particles, which diminishes the facility with which they may be repelled from the electrode and enables them to remain on the electrode, possibly due to a certain degree of adhesion. In practice, I prefer to combine the two latter methods, as they are better adapted to continuous operation on a commercial scale.

The presence of water in oils tends to impart considerable conductivity to the mixture. This is a disadvantage in the practice of my invention, since the current consumption may be materially increased, possibly to such an extent as to render the operation uneconomical. Furthermore, the electrostatic separation might under some circumstances with considerable water present be accompanied by electrolysis which would have a deleterious effect upon the separation or the character of the products obtained. I therefore prefer to use a substantially water-free wax-bearing oil as my starting material.

It is an object of my invention to provide a process and apparatus for the electrostatic separation of solid wax particles from petroleum oils.

A further object of my invention is to provide a continuous process and apparatus for the separation of wax from petroleum oils which is substantially independent of the physical condition of the wax, so long as it is in the solid state.

A still further object of my invention is to provide a continuous process and apparatus for the electro-static separation of wax from petroleum oils by the use of a substantially unidirectional high voltage electro-static field.

A further object of my invention is to provide a process and apparatus as just described in which the wax is so collected that the treated oil is not required to pass through the collected wax prior to its withdrawal.

Figure 2:
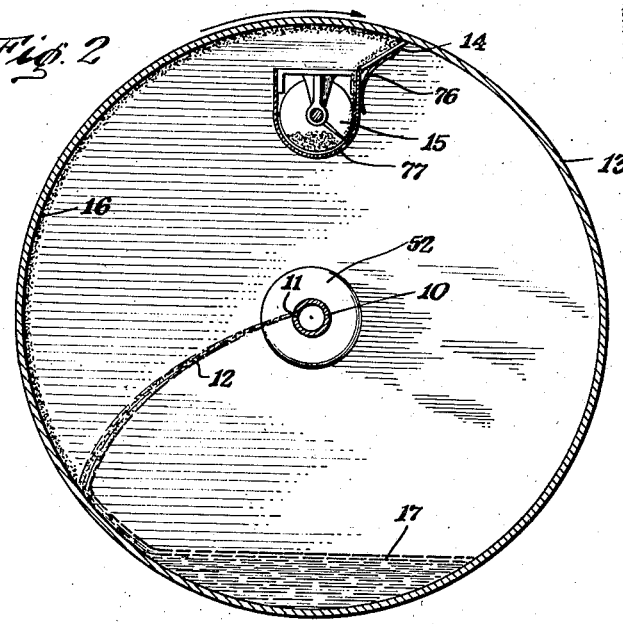

My invention will be more readily understood by reference to the following description, taken in conjunction with the accompanying drawing, in which Figure 1 is a longitudinal elevation, partially in section, of a apparatus suitable for carrying out my process; and Figure 2 is a vertical cross section taken on the line 2—2 of Figure 1.

In the practical application of my invention to the continuous separation of solid wax particles from petroleum oil, particularly lubricants, I prefer to pump the diluted and refrigerated wax-bearing oil in a continuous stream into a hollow tubular anode which is provided along one side with perforations through which the oil is permitted to escape in jets directed towards the surface of a collecting cathode, preferably a shell circular in cross-section and co-axial with the anode. The anode and cathode may advantageously be horizontally disposed, the jets being so arranged as to strike against the side of the shell. The cathode shell may be rotated slowly by any suitable means so that the adhering wax is continuously carried out of the zone in which the jets of liquid impinge. The wax may be removed from the cathode near the top thereof by suitable scrapers and screw conveyors. The treated oil runs down the inside surface and collects at the bottom of the shell, from which it may be withdrawn continuously or from time to time as desired. The pumping pressure should preferably be such as to carry the oil across the space between the electrodes so that it will meet the wall of the cathode without too great velocity above the level of the pool of wax-free oil in the bottom. Of course, the space between the electrodes must be sufficiently great so that there is no opportunity of direct arcing between the electrodes under the potentials employed.

The procedure just described is simply and clearly illustrated in Figure 2, in which 10 represents a horizontally disposed tubular anode which is kept positively charged at a high potential by a suitable electric circuit. Wax bearing oil is pumped into one end of the tubular anode 10 under pressure, the other being closed, and is permitted to escape through apertures 11 in the form of lateral jets 12. The anode 10 is axially disposed within a cathode shell 13 which forms the other terminal of the electric circuit referred to above. The cathode 13 is preferably rotated in the direction indicated by the arrow. Near the top of the cathode 13 is located a scraper 14 bearing upon the internal surface of the shell, and a screw conveyor 15 is arranged below the scraper 14.

I have found that in order to produce a satisfactory separation of wax and lubricating oil, it is desirable to employ extremely high potentials in the neighborhood of 125 to 250 kilovolts. Since very little current is consumed, it is neither difficult nor expensive to secure a direct current potential of this magnitude by stepping up an alternating current to the desired voltage by means of a transformer, and then rectifying one or both halves of the cycle by means of vacuum tube rectifiers. Apparatus of this kind is well known to electrical engineers, and hence need not be described in detail. Contrary to a popular misconception, no visible electric discharge will accompany the operation of this equipment, although in a darkened room the positive electrode may be observed to glow with a violet-colored effulgence. This is the so-called corona effect, and occurs entirely without the formation of heat. Hence this process may be practiced upon refrigerated oil without substantially raising its temperature.

My research has not yet established to my own satisfaction whether the wax particles acquire a positive charge by direct conduction from the anode 10 while they are passing therethrough, or whether they acquire their charge while passing through the brush or glow discharge surrounding the anode, possibly by the condensation of positive ions on the solid wax particles. Possibly both effects are present. At all events, when the jets 12 strike the side of the cylindrical cathode 13, the wax particles are positively charged, are attracted to the cathode by virtue of their opposite polarity, and adhere to the side of the cylinder in the form of a film or layer of wax 16. As the cylinder rotates, the adhering wax reaches the scraper 14, is scraped off and deposited in the conveyor 15. The wax free oil, on the other hand, runs down the side of the cylinder, and collects in a pool 17 at the bottom thereof.

Referring more particularly to the drawing, the rotating cathode 13 may be a frustro-conical cast steel shell, horizontally disposed and mounted so as to rotate about its longitudinal axis. The frustro-conical shape is preferred to a strictly cylindrical shape because the former permits the treated wax-free oil to drain towards the larger end or lower base of the frustrum. The larger end of the shell 13 may be provided with an integral annular channel 20 having an inwardly extending flange 21. A plurality of elevator buckets 22 are formed in the channel 20, and function in the withdrawal of the treated oil from the shell as hereinafter described. A head 23 provided with strengthening ribs 24 is secured to the flange 21 by bolts 25, the joint between the head and the flange 21 being, of course, sealed by a suitable gasket or other packing means not shown. A hollow trunnion 26 is centrally located on the head 23 and formed integrally therewith, and is journaled upon a cylindrical bronze sleeve 27. The sleeve 27 is secured to a supporting bracket or cross-arm 28 mounted upon a pair of insulating supporting pillars 29, and the sleeve 27 is thereby prevented from turning with the shell 13.

The upper base or smaller end 30 of the shell 13 is preferably cast integral with the shell wall as shown, and is provided with an integral hollow trunnion 31 journaled in a split bearing 32 carried by an offset bracket or cross-arm 33 mounted upon a pair of insulating supporting pillars 34. Washers 35 are placed on either side of the bearing 32 to center the trunnion 31 in the bearing and take up any excessive longitudinal play.

The shell 13 and head 23 are enclosed as completely as may be within a fiber jacket 36 containing cork or other heat insulating material 37, so that as little heat as possible will be taken up by the oil from the surrounding atmosphere.

A shaft hanger 38 is mounted upon the bracket 28 and carries at its upper end a drive shaft 39 having at one end a drive pinion 40. The pinion 40 engages a ring gear 41 secured to the wood ring gear support 42, which in turn is secured to the channel 20 of the shell 13. The drive shaft 39 terminates at its other end in a coupling 43, which is driven by a micarta or other insulating material drive shaft 44, suitably rotated, for example, by an electric motor (not shown).

A high tension insulating anode bushing 45 passes through the trunnion 31 into the interior of the shell 13, and a bronze sleeve 46 is molded into the surface of the bushing 45 where it passes through the trunnion to prevent abrasion of the insulator. A cast brass yoke 47, preferably terminating in two spheres 48, has a central portion 49 which is molded into the outer end of the insulator 45, and serves as a cap for the insulator. Each sphere 48 is secured to an insulating pillar 50, and the anode bushing 45 is thereby positioned laterally with respect to the trunnion 31 and is prevented from turning with the trunnion. The anode lead 51 may be connected directly to one of the spheres 48.

The anode 10, which may be made for example of copper tubing, extends through the bushing 45 and the cap 49, and may be brazed to the cap 49 so as to secure an air-tight joint as well as a good electrical connection and thus complete the circuit from the anode lead 51 to the anode 10. The anode 10 is centered within the bushing 45 at the inner end of the bushing by a fiber end block 52 suitably secured to the bushing. The space within the bushing 45 surrounding the anode 10 is filled with heat insulating material 53 so that the insulator 45 will not become frosted and thereby short circuit the high tension current. The inner end of the anode 10 is closed by an insulating disk 55 which serves to prevent flash over between the end of the anode and the shell head 23. The anode 10 is provided along one side of the portion of its length within the cathode 13 with a plurality of apertures 11 through which the wax bearing oil escapes as described.

The anode 10 terminates at its outer end in a flange 59 to which is connected an insulating coupling and packing joint 60. Beyond the coupling 60 is connected a length of fiber tubing 61, through which the chilled oil to be treated is introduced to the anode 10 from a suitable pump. The fiber tubing 60 is surrounded by a fiber casing 62 filled with cork or other heat insulation 63.

The spaces between the trunnion 26 and the sleeve 27 and between the trunnion 31 and the sleeve 46 are sealed by the packing glands 64 and 65, respectively, each containing packing material 66.

The oil and wax removal apparatus is supported by the sleeve 27 on which the rear end of the shell 13 is journaled, and the treated oil and the separated wax are removed from the shell through this hollow sleeve 27. The outer end of the sleeve 27 opens into an air-tight metal hood 67, the lower end of which connects with a vertical discharge conduit 68 of bakelite or other insulating material, which is sealed into a metal conduit 69 supported by a floor grating 70 and dipping into a water seal.

In order to remove the treated oil from the shell 13, the annular channel 20 of the shell is provided with a plurality of elevator buckets 22, as described above, which pick up the oil and dump it at a level slightly above the axis of the shell into a collecting funnel 71. This funnel is shown in Figure 1 in dotted lines since it is in front of the central vertical plane through which the section is taken. The funnel 71 discharges through a passageway 72 into an oil outlet pipe 73, which may be of bronze or similar material. The outer end of the outlet pipe 73 passes through the hood 67 and terminates in an insulating packing and coupling joint 74 to which is connected a length of fiber tubing 75 through which the treated oil is conducted away from the apparatus.

The wax adhering to the inside of the shell 13 as described above, is removed by the hinged scrapers 14, which are urged against the inside surface of the shell by the flat springs 76, shown in Figure 2. The scrapers 14 discharge the wax into a trough 77 containing a screw conveyor 15. The shaft 78 of this screw conveyor is provided with a sprocket 79 driven through a chain 80 (shown in dot and dash lines for clarity) by a sprocket 81 mounted upon a tubular shaft 82 surrounding the oil outlet pipe 73. The wax is discharged by the screw conveyor 15 into the rectangular metal duct 83 and is picked up by the screw conveyor 84. The screw conveyor 84 is secured to the tubular shaft 82 and carries the wax through the sleeve 27 and into the hood 67. The wax falls through the bakelite discharge conduit 68 and the water seal into a main wax screw conveyor 85.

The tubular shaft 82 is driven by sprockets 86 and 87 and chain 88 from the drive shaft 39.

The cathode lead 89 may be connected directly to the shaft hanger 38, and the current passes thence through the bronze sleeve 27 to the journal 26 and to the cathode shell 13.

An air purging line 90 is connected to the hood 67, and may be closed by a valve not shown.

It will be noted that the oil to be treated enters the apparatus through the insulating fiber conduit 61, and the treated oil leaves the apparatus through the similar conduit 75. Likewise the separated wax is conveyed away from the apparatus through the insulating discharge conduit 68. The apparatus as a whole is mounted upon insulating pillars and is driven through the insulating drive shaft 44, hence the entire apparatus is electrically insulated from the ground, and the potentials of its electrodes are therefore determined by the potential impressed across the anode lead 51 and the cathode lead 89.

In operation, the chilled and diluted wax bearing oil to be treated is introduced from a pump under a few pounds pressure through the fiber tube 61 into the anode 10. From the anode 10 the oil escapes through the apertures 11 in the form of jets which strike the wall of the rotating cathode 13. The separation of the wax occurs as described above, and the separated wax is removed from the shell 13 by the scrapers 14 and conveyed by the screw conveyors 15 and 84 into the insulating discharge conduit 68 and the main wax conveyor 85. The treated oil collecting in the bottom of the cathode 13 is elevated by the buckets 22 and deposited in the funnel 71, thence flowing out through the oil outlet pipes 73 and 75 to storage or other point of deposit. As stated above, I prefer to carry out my process in the absence of oxygen. In order to do this, I fill the apparatus with the non-explosive gas to be employed, such as fuel gas, through the anode 10 before starting the flow of oil therethrough. The air is thereby flushed out and is permitted to escape through the air purging line 90 connected to the hood 67 until tests show that an atmosphere has been obtained in the apparatus that will be non-explosive when the oil and diluent are introduced. The valve on the air purging line 90 may then be closed, the supply of gas through the anode 10 discontinued and the flow of oil therethrough commenced, simultaneously applying the high potential to the apparatus.

Although I have described my invention in its preferred form as now contemplated by me, it will be evident that many changes may be made therein without departing from my invention. For example, my process and apparatus may obviously be applied to the electro-static separation of suspensions of solid particles in liquids other than suspensions of solid waxes in petroleum oils, provided the physical properties of the substances to be separated are sufficiently similar to those of the substances mentioned. The foregoing description is by way of illustration merely and not of limitation, and I therefore desire my invention to include modifications of the foregoing process and apparatus and to be limited only by the prior art and the scope of the appended claims.

I claim:

1. The method of separating solid wax particles from a petroleum oil, which comprises impressing electric charges of a definite polarity upon the solid wax particles by subjecting the wax bearing oil to the action of a high potential unidirectional current, and collecting said charged particles upon an electrode of opposite polarity by contacting the wax bearing oil with said collecting electrode.

2. The method of separating solid wax particles from a petroleum oil, which comprises impressing electric charges of a definite polarity upon the solid wax particles by subjecting the wax bearing oil to the action of a high potential unidirectional current, collecting said charged particles upon an electrode of opposite polarity by contacting the wax bearing oil with said collecting electrode, and withdrawing the treated oil without filtering it through the wax collected on the collecting electrode.

3. The method of separating solid wax particles from a petroleum oil, which comprises impressing electric charges of a definite polarity upon the solid wax particles by subjecting the wax bearing oil to the action of a high potential unidirectional current, collecting said charged particles upon an electrode of opposite polarity by contacting the wax bearing oil with said collecting electrode, moving the collecting electrode to disassociate the collected wax and the treated oil, withdrawing the treated oil, and removing the wax from the collecting electrode.

4. The method of separating solid wax particles from a petroleum oil which comprises bringing said wax bearing oil into contact with one of a pair of spaced electrodes of opposite polarity connected to a source of high potential unidirectional current, and directing said oil into contact with the other electrode, whereby electric charges having the polarity of said first electrode are impressed upon said wax particles and the charged particles are collected upon said second electrode of opposite polarity.

5. The method of separating solid wax particles from petroleum oils which comprises applying a high potential unidirectional current across an anode and a cathode spaced therefrom, subjecting a continuous stream of wax bearing oil to the influence of said anode to impress positive electric charges on the solid wax particles, and directing the stream of oil and charged wax particles against said cathode to attract and collect said charged particles.

6. The method of separating solid wax particles from a petroleum oil which comprises passing a continuous stream of said wax bearing oil from a high potential unidirectional current charging means to an oppositely charged collecting means in the presence of a non-explosive gas.

7. The method of separating solid wax particles from a petroleum oil, which comprises chilling the wax bearing oil to solidify the wax borne thereby, bringing said oil into contact with one of a pair of oppositely charged electrodes connected to a source of high potential unidirectional current, and directing said oil into contact with the other electrode, whereby electric charges having the polarity of said first electrode are impressed upon said wax particles and the charged particles are collected upon said second electrode of opposite polarity.

8. The method of separating solid wax particles from a wax bearing petroleum oil which comprises subjecting said oil to a high potential alternating current to coalesce said particles, and passing a stream of oil bearing said coalesced particles from a high potential unidirectional current charging means to an oppositely charged collecting means.

9. The method of separating wax from a wax bearing petroleum oil which comprises chilling said oil to solidify the wax into particles, subjecting said oil to a high potential alternating current to coalesce said particles, and passing a stream of oil bearing said coalesced particles from a high potential unidirectional current charging means to an oppositely charged collecting means.

10. The method of separating solid wax particles from wax bearing petroleum oils which comprises applying a high potential unidirectional current across spaced electrodes, subjecting the oil to the influence of one of said electrodes to impart electric charges of corresponding polarity to the wax particles borne by the oil, directing the oil and charged wax particles into contact with the electrode of opposite polarity to collect the charged wax particles, and moving said second electrode to disassociate the collected particles and the treated oil.

11. The method of separating particles of non-conducting solids from a liquid which comprises passing a continuous stream of liquid bearing particles of said solids carrying electric charges from a charging electrode to a collecting electrode of opposite polarity, collecting said charged particles on said collecting electrode, forming a pool of treated liquid out of contact with said collected particles, and continuously removing treated liquid from said pool.

12. The method of separating particles of non-conducting solids from a liquid which comprises passing a continuous stream of liquid bearing particles of said solids carrying electric charges from a charging electrode to a collecting electrode of opposite polarity, collecting said charged particles on said collecting electrode, forming a pool of treated liquid out of contact with said collected particles, moving said collecting electrode to form a continuous deposit of collected particles thereon, continuously removing said deposit of collected particles from said electrode, and continuously removing treated liquid from said pool.

13. Apparatus for removing solid wax particles from a wax bearing petroleum oil, comprising a rotatable container, a conduit for continuously introducing oil into said container, said conduit and container, respectively, constituting an anode and a cathode adapted to be connected to a source of unidirectional potential for imparting positive electric charges to the wax particles borne by the oil, means for directing a stream of oil from said conduit against a wall of said container, the positively charged particles carried in said stream being attracted by the negatively charged wall of said container and collecting thereon and the treated oil flowing to the bottom of said container to form a pool of treated oil, means for rotating said container to form a continuous deposit of collected particles on said wall of said container, means for continuously removing said deposit of collected particles from said wall during the rotation thereof, and means for continuously withdrawing treated oil from said pool to maintain the level of said pool below said conduit electrode so that the charged particles do not pass through said pool prior to collecting on the wall of said container.

14. Apparatus for removing solid wax particles from a wax-bearing petroleum oil, comprising a rotatable container, a conduit extending into said container out of contact with the sides thereof for continuously introducing oil into said container, said conduit having perforations for directing streams of oil from said conduit against a wall of said container, means for applying a unidirectional potential across said conduit and container, the wax particles carried in said streams being charged and attracted by the oppositely charged wall of said container and collecting thereon and the treated oil flowing to the bottom of said container to form a pool of treated oil, means for rotating said container to form a continuous deposit of collected particles on said wall of said container, means for continuously removing said deposit of collected particles from said wall during the rotation thereof, and means for continuously withdrawing treated oil from said pool to maintain the level of said pool below said conduit electrode so that the charged particles do not pass through said pool prior to collecting on the wall of said container.

ROBERT E. STANTON.